(12) United States Patent
Sun

(10) Patent No.: US 6,538,789 B2
(45) Date of Patent: Mar. 25, 2003

(54) OPTICAL LINEARIZER FOR FIBER COMMUNICATIONS

(75) Inventor: Chen-Kuo Sun, Escondido, CA (US)

(73) Assignee: Lightwave Solutions, Inc., Escondido, CA (US)

(*) Notice: Subject to any disclaimer, the term of this patent is extended or adjusted under 35 U.S.C. 154(b) by 0 days.

(21) Appl. No.: 09/825,631

(22) Filed: Apr. 3, 2001

(65) Prior Publication Data

US 2002/0171894 A1 Nov. 21, 2002

(51) Int. Cl.⁷ .............................. H04B 10/00
(52) U.S. Cl. .................. 359/161; 359/110; 359/187
(58) Field of Search ..................... 319/161, 173, 319/187, 188, 127, 110

(56) References Cited

U.S. PATENT DOCUMENTS

| | | |
|---|---|---|
| 3,794,841 A | 2/1974 | Cosentino |
| 4,809,257 A | 2/1989 | Gantenbein |
| 5,003,546 A | 3/1991 | Lidgard |
| 5,161,044 A * | 11/1992 | Nazarathy et al. .......... 359/157 |
| 5,229,593 A | 7/1993 | Cato |
| 5,252,930 A | 10/1993 | Blauvelt |
| 5,257,124 A | 10/1993 | Glaab |
| 5,282,072 A | 1/1994 | Nazarathy |
| 5,416,627 A | 5/1995 | Wilmoth |
| 5,424,680 A | 6/1995 | Nazarathy |
| 5,436,749 A | 7/1995 | Pidgeon |
| 5,481,389 A * | 1/1996 | Pidgeon et al. ............. 359/161 |
| 5,680,104 A | 10/1997 | Slemon |
| 5,777,768 A | 7/1998 | Korevaar |
| 6,122,085 A * | 9/2000 | Bitler ........................ 359/161 |

OTHER PUBLICATIONS

Anne Lidgard et al.; Generation and Cancellation of Second–Order Harmonic Distortion in Analog Optical Systems by Interferometric FM–AM Conversion; Jul. 1990; IEEE Photonics Technology Letters, vol. 2, No. 7.

C.Y. Kuo et al.; Erbium–Doped Fiber Amplifier Second–Order Distortion in Analog Links and Electronic Compensation; Sep. 1991; IEEE Photonics Technology Letters, vol. 3, No. 9.

C.Y. Kuo; Fundamental Second–Order Nonlinear Distortions in Analog AM CATV Transport Systems Based on Single Frequency Semiconductor Lasers; Feb. 1992; Journal of Lightwave Technology, vol. 10, No. 2.

* cited by examiner

Primary Examiner—Kinfe-Michael Negash
(74) Attorney, Agent, or Firm—Fish & Richardson P.C.

(57) ABSTRACT

A method for linearizing optical transmission systems that includes an optical linearizer connected to the output of the optical transmitter. From the output, which includes a modulated signal and a transmitter distortion, the linearizer interacts with the wavelength chirping ($d\lambda_c$) of the transmitter output. More specifically, the linearizer is characterized by a wavelength dependent optical transfer curve $F(\lambda)$ that utilizes $d\lambda_c$ to induce a compensation distortion. Further, the optical transfer curve $F(\lambda)$ has a reference wavelength ($\lambda_p$) and an operating point wavelength offset ($\Delta\lambda_b$). In operation, ($\lambda_p+\Delta\lambda_b$) of the optical transfer curve $F(\lambda)$ is aligned with ($\lambda_c$) of the output to establish an effective value for the compensation distortion. This compensation distortion is then added with the transmitter distortion to cancel the transmitter distortion from the modulated signal; to thereby linearize the output.

27 Claims, 4 Drawing Sheets

OPTICAL LINEARIZER FOR FIBER COMMUNICATIONS

FIELD OF THE INVENTION

The present invention pertains generally to optical transmission systems. More particularly, the present invention pertains to devices and methods for optically linearizing the nonlinear distortions that are inherently introduced into signals produced within the optical transmission system. The present invention is particularly, but not exclusively, useful as a signal processor that can be incorporated into a fiber optic transmission system to optically compensate for the second and/or third order distortions that are produced in the system.

BACKGROUND OF THE INVENTION

In a conventional fiber optic transmission system, an electrical information signal is used to modulate the intensity of an optical transmitter. The resultant modulated signal is then transmitted over a distance through an optical fiber. After passing through the optical fiber, the modulated signal is converted back into an electrical signal by an optical receiver. It is well known that the information carried on such a modulated signal may be either in a digital, an analog or a mixed signal format. For several reasons, such as an enhanced multiplexing capability, there is an increasing interest in delivering digital information via optical fibers in an analog format. Fiber optic transmission systems, however, are susceptible to degrading distortions which can significantly affect the quality of the communications.

Laser diodes are well known devices that are now commonly used for transmitting signals with an analog format over a fiber optic transmission system. Laser diodes, however, like all other analog optical transmitters, have nonlinear transmission responses. Unfortunately, the nonlinearites introduced by the transmitters are often aggravated by the optical fiber, or by certain other optical components in the system. It happens that these nonlinear responses are predominantly second-order distortions and third-order distortions (distortions that can create spurious frequencies that fall within the bandwidth of interest). Obviously, it is desirable that these distortions be removed from transmitted signals.

Heretofore, several electronic methods have been disclosed for the purpose of linearizing the outputs of laser diode transmitters. More specifically, these methods have been directed toward linearizing laser diodes when they are used in fiber optic analog transmission systems. In general, these methods have tended to include the use of predistortion circuits that intentionally generate distorted signals having second-order or third-order distortions. Typically, the distorted signals are generated with the same amplitude as the distortions generated in the system, but they have an opposite phase. Thus, when added together, the distortions generated by the predistortion circuits are intended to cancel the distortions that are introduced into the system by the laser diode transmitter. Predistortion circuits in general are limited in bandwidth due to the state of the art electronic circuit limitation.

In addition to predistortion circuits, it is known that other linearization schemes can be fabricated in several ways. For example, known linearization schemes include: 1) cancellation by complimentary outputs; 2) push-pull operations with wavelength division multiplexing; and 3) the use of Fabry-Perot devices. These linearization schemes have, however, been susceptible to system degradation for several reasons. Specifically, scheme 1, as mentioned above, suffers from the need for two stable transmission fibers and scheme 2 suffers from electronic component bandwidth limitation. Furthermore, scheme 3 suffers from instability due to the difficulty in maintaining precise wavelength alignment between the laser diode and the Fabry-Perot.

In light of the above, it is an object of the present invention to provide an optical apparatus for linearizing the output of an optical transmitter. Another object of the present invention is to provide an apparatus for linearizing the output of an optical transmitter that can be effectively wavelength (e.g. temperature) tuned for proper operation. Yet another object of the present invention is to provide an apparatus for linearizing an optical transmission system with selected optical devices that can have either linear or nonlinear wavelength dependent optical responses. Still another object of the present invention is to provide an apparatus for linearizing an optical transmission system that is simple to use, is relatively easy to manufacture, and is cost effective.

SUMMARY OF THE PREFERRED EMBODIMENTS

In accordance with the present invention, a communications apparatus for linearizing the output of an optical transmitter (such as a DFB laser diode), includes an optical device (such as a fused fiber WDM coupler). Specifically, the optical device is connected to receive the output of the optical transmitter. It happens that the output from the optical transmitter will include a modulated signal, as well as second and third order distortions (hereinafter sometimes collectively referred to as a "transmitter distortion"). Importantly, the transmitter output also includes a characteristic wavelength "chirping". In accordance with the present invention, this "chirping," together with the desired transmitter output, is used as an input by the optical device, to optically generate nonlinear distortion signals (hereinafter sometimes collectively referred to as "compensation distortions") that will compensate the transmitter distortion. Accordingly, the compensation distortions can be added to the output of the optical transmitter to cancel the transmitter distortions (second and/or third order distortions) in the output.

Technically, the modulated signal that is transmitted by the transmitter (e.g. laser diode) will have a center emission wavelength ($\lambda_c$) and a characteristic wavelength chirping ($d\lambda_c$). Further, the optical device (e.g. coupler) will include components for establishing a predetermined, wavelength dependent, normalized optical transfer curve $F(\lambda)$. Specifically, this optical transfer curve $F(\lambda)$ is fabricated to accommodate the operating condition of the optical transmitter. In particular, the optical transfer curve $F(\lambda)$ of the optical device is designed to have a reference wavelength ($\lambda_p$), a slope determinant wavelength spacing ($\Delta\lambda_w$), and an operating point wavelength offset ($\Delta\lambda_b$) that are all based on the known operating conditions of the transmitter.

In their connection with each other, the optical device and the optical transmitter can be individually or collectively wavelength (e.g. temperature) tuned. Preferably, an operating temperature for the optical transmitter (or optical device) can be established which will align ($\lambda_c$) of the transmitter with ($\lambda_p+\Delta\lambda_b$) of the optical device. Regardless how the operating temperature is established, when the system is tuned, an operating point can be established on the optical transfer curve $F(\lambda)$ that will interact with the wavelength chirping ($d\lambda_c$) from the transmitter in a specified manner.

Preferably, this operating point is established on the optical transfer curve $F(\lambda)$ where $\lambda_p + \Delta\lambda_b = \lambda_c$. Thus, the purpose here is to use $F(\lambda)$ to optically induce a compensation distortion from the wavelength chirping ($d\lambda_c$) that will substantially compensate the transmitter distortions (second and/or third order distortions) that are introduced by the transmitter. Once the compensation distortions have been induced by the optical device (e.g. coupler), linearization of the optical transmitter (e.g. laser diode) is accomplished by adding the compensation distortion to the output of the transmitter. Stated differently, the compensation distortion is added to the output of the optical transmitter to cancel the transmitter distortion from the modulated signal in the output.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
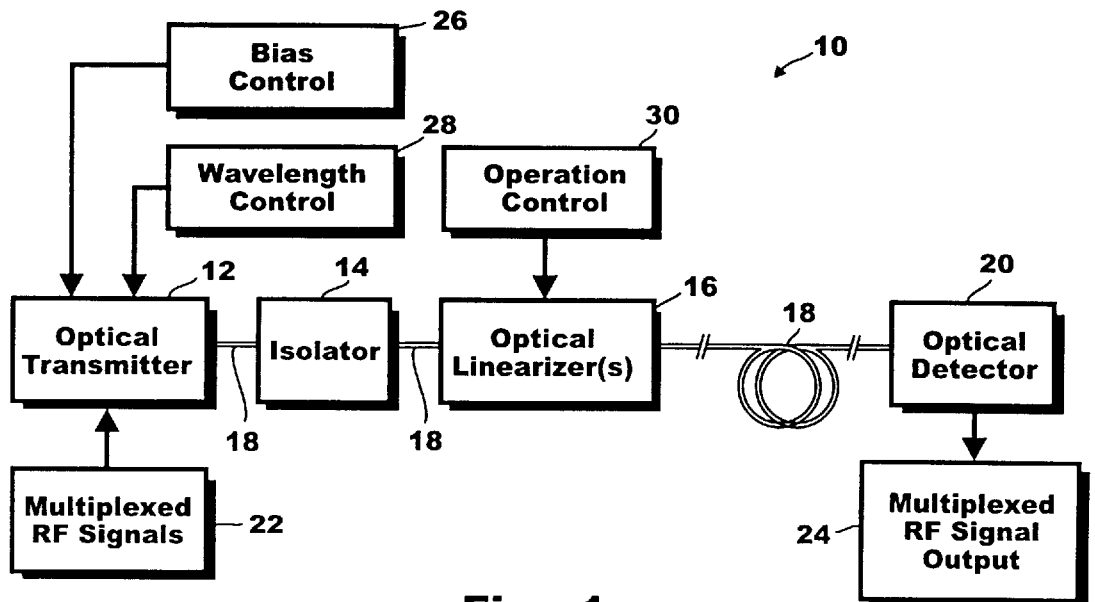
FIG. 1 is a schematic drawing of a fiber optic transmission system incorporating an optical linearizer in accordance with the present invention.

Referring initially to FIG. 1, a fiber optic transmission system in accordance with the present invention is shown and is generally designated 10. As shown, the system 10 includes an optical transmitter 12 that is connected with an isolator 14 that is, in turn, connected with an optical linearizer 16. An optical fiber 18 then interconnects the optical linearizer 16 with an optical detector 20. As intended for the system 10 of the present invention, communications data is generated by a signal source 22 and is used to modulate the optical transmitter 12. The communications data from signal source 22 may be in a digital, an analog, or a mixed format. In any event, the isolator 14 (which is optional) is positioned to prevent optical back reflection into the transmitter 12. The modulated signal of the output of optical transmitter 12 is then fed into the optical linearizer for subsequent transmission through the optical fiber 18 to the optical detector 20. A receiver 24 that is connected to the optical detector 20 provides an output of the received communications data.

For purposes of the present invention, the optical transmitter 12 is preferably a laser diode of a type well known in the pertinent art, such as a DFB laser diode. It is to be appreciated, however, that the optical transmitter 12 can be a direct modulated laser diode, an electro-absorption modulator, or a Mach-Zehnder modulator, all of which are well known in the art. Importantly, in all cases, the output of the optical transmitter 12 at $\lambda_c$ may have an analog modulation format that is sinusoidal in nature. It is also important to recognize that, in all cases, the output of the optical transmitter 12 will include more than just the modulated signal that is to be transmitted over the system 10. Specifically, in addition to the modulated signal, the output of optical transmitter 12 will include optical distortions (second and/or third order) and it will have a "chirping" ($d\lambda_c$) that is characteristic of the optical transmitter 12. For the system 10, a bias control 26 can be used to influence the content of the output from the optical transmitter 12 (e.g. minimizing the third order distortions), while a wavelength control 28 is used to establish (tune) the center emission wavelength ($\lambda_c$). In a manner well known in the pertinent art, wavelength control 28 can be tuned in several ways, such as by temperature tuning, voltage tuning, current tuning or mechanical tuning.

The optical linearizer 16 of the present invention is preferably an optical device of a type that is well known in the pertinent art, such as a fused fiber WDM coupler. The optical linearizer 16, however, may alternatively be any well known type of optical device with a wavelength dependent transfer function that may include wavelength dependent absorptive (or gain) materials, electro-absorption semiconductor waveguides, fiber Bragg-gratings, wavelength dependent coupling interleavers, Mach-Zehnder waveguide modulators, acoustic-optical tunable filters, tapered fiber filters, thin film filters or arrayed waveguide grating (AWG) filters. Importantly, the system 10 can use these types of devices for the optical linearizer 16 either individually or in combination with each other. Importantly, regardless of the type device that is used for the linearizer 16, the optical linearizer 16 is fabricated to have a specific optical transfer curve $F(\lambda)$. Because the optical linearizer 16 is a wavelength dependent device, it can be tuned like the optical transmitter 12. For the optical linearizer 16, this tuning is accomplished by the operation control 30.

Figure 2:
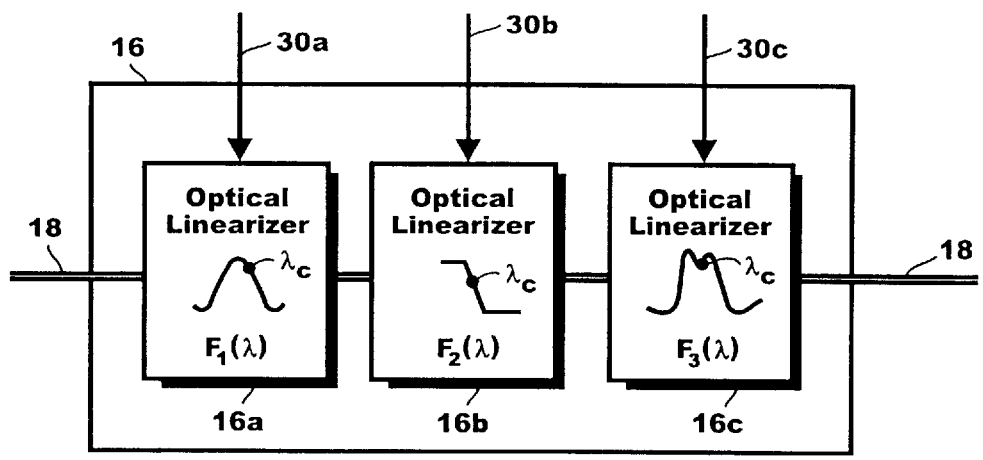
FIG. 2 illustrates various exemplary optical transfer curves $F(\lambda)$ that can be incorporated in an optical linearizer in accordance with the present invention.

FIG. 2 shows various types of exemplary optical transfer curves that can be fabricated for the optical linearizer 16. Specifically, the optical linearizers 16a, 16b and 16c are shown with respective optical transfer curves $F_1(\lambda)$, $F_2(\lambda)$ and $F_3(\lambda)$ that may be controlled (tuned) by respective operation controls 30a, 30b and 30c. It is to be appreciated that the optical linearizers 16a, 16b and 16c are only exemplary, and that they may be used either individually or collectively in the system 10, as required. Further, these linearizers 16a, 16b and 16c all function substantially in the same way. The functionality of the linearizers 16a, 16b and 16c, and their interaction with the optical transmitter 12 will, perhaps, be best appreciated with reference to FIG. 3.

Figure 3:
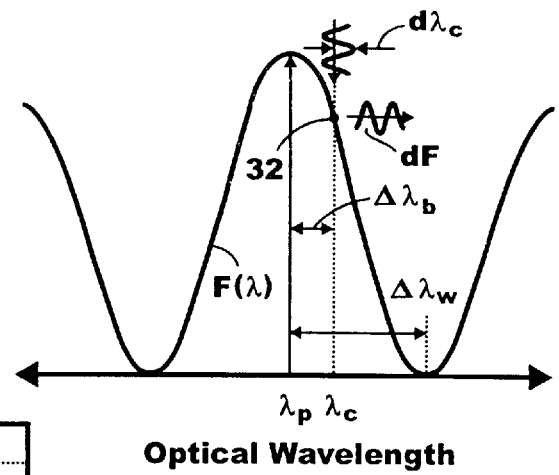
FIG. 3 is an optical transfer curve $F(\lambda)$ showing a chirped wavelength input ($d\lambda_c$) interacting with the optical transfer curve $F(\lambda)$ to create modulations (dF) to induce compensation distortions that are useful for linearizing the output of an optical transmitter.

FIG. 3 shows an optical transfer curve $F(\lambda)$ that is typical of one that can be fabricated for a fused fiber WDM coupler type optical linearizer 16. As shown, the optical transfer curve $F(\lambda)$ is characterized by a reference wavelength ($\lambda_p$) and a slope determinant wavelength spacing ($\Delta\lambda_w$). Also, FIG. 3 shows a typical operating point 32 for the optical linearizer 16 that is identified by the wavelength offset $\Delta\lambda_b$.

For the optical transfer curve F(λ) shown in FIG. 3, the slope of the curve will change as the operating point 32 is changed. This, of course, need not always be so (e.g. linearizer 16b in FIG. 2). Nevertheless, for the optical transfer curve F(λ) shown in FIG. 3, both the reference wavelength ($\lambda_p$), and a slope determinant wavelength spacing ($\Delta\lambda_w$), can be fabricated for the optical transfer curve F(λ). The coupler operating point offset ($\Delta\lambda_b$) can then be established (tuned) on optical transfer curve F(λ) by the operation controller 30. Preferably, this is done by temperature tuning.

Figure 4A:
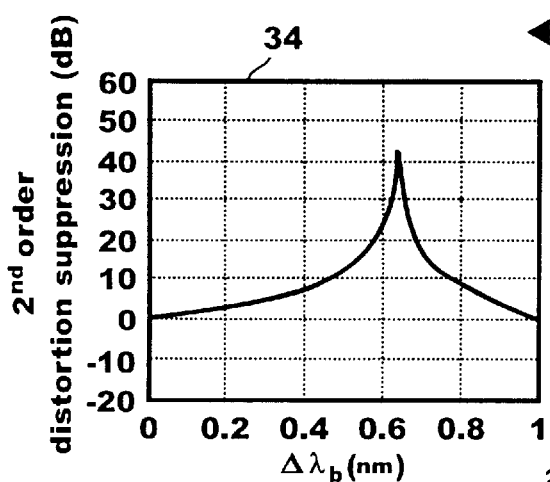
FIG. 4A is a graph showing empirical results for suppression of second order distortions as a function of the operating point wavelength of an optical linearizer.
Figure 4B:
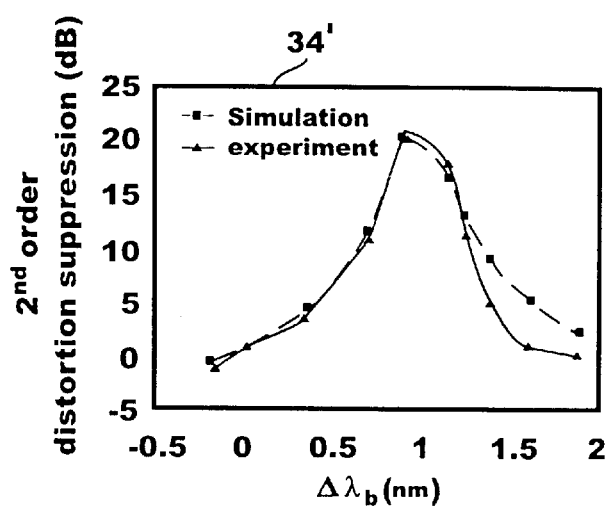
FIG. 4B is a graph showing a comparison between simulation results and experimental data for a specific operating condition of the present invention.
Figure 5:
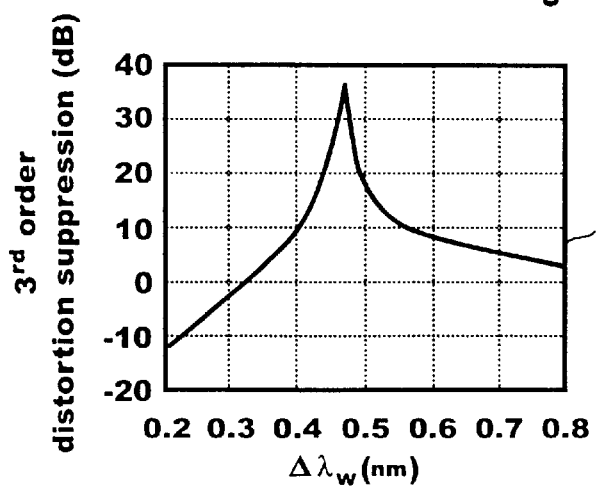
FIG. 5 is a graph showing empirical results for suppression of third order distortions as a function of a slope determinant wavelength spacing of an optical linearizer.

Still referring to FIG. 3, it will be appreciated that the operating point 32 should be established where $\lambda_c=\lambda_p+\Delta\lambda_b$. Accordingly, when the wavelength chirped $d\lambda_c$ from the optical transmitter 12 is fed into the optical linearizer 16, the interaction of the wavelength chirped $d\lambda_c$ at the operating point 32 of the optical transfer curve F(λ) results in an output having modulations (dF). FIGS. 4A and 5 respectively show graphs 34, 36 that present empirical data for the suppression of optical distortions in a system 10. Further, FIG. 4B shows a comparison 34' between an empirical simulation and experimental data obtained for a suppression of optical distortions similar to those shown for the graph 34 of FIG. 4A. Specifically, these graphs 34, 36 indicate there is an identifiable operating point wavelength offset $\Delta\lambda_b$, and an identifiable slope determinant wavelength spacing ($\Delta\lambda_w$) for each optical linearizer 16 that will induce a modulation (dF) which will effectively suppress transmitter distortions (second and/or third order) that are introduced into the system 10.

Several alternate embodiments of the system 10 are envisioned for the present invention. For example, one alternate embodiment (FIG. 6A) shows a system 10A wherein closed loop feedback control is provided for the local optical transmitter 12. On the other hand, another alternate embodiment (FIG. 6B) shows a system 10B wherein closed loop feedback control is provided to achieve nonlinear distortion suppression of the whole system, including distortions induced by fiber transmission (optical fiber 18) and detection (optical detector 20) and any other optical components in the system 10.

Figure 6A:
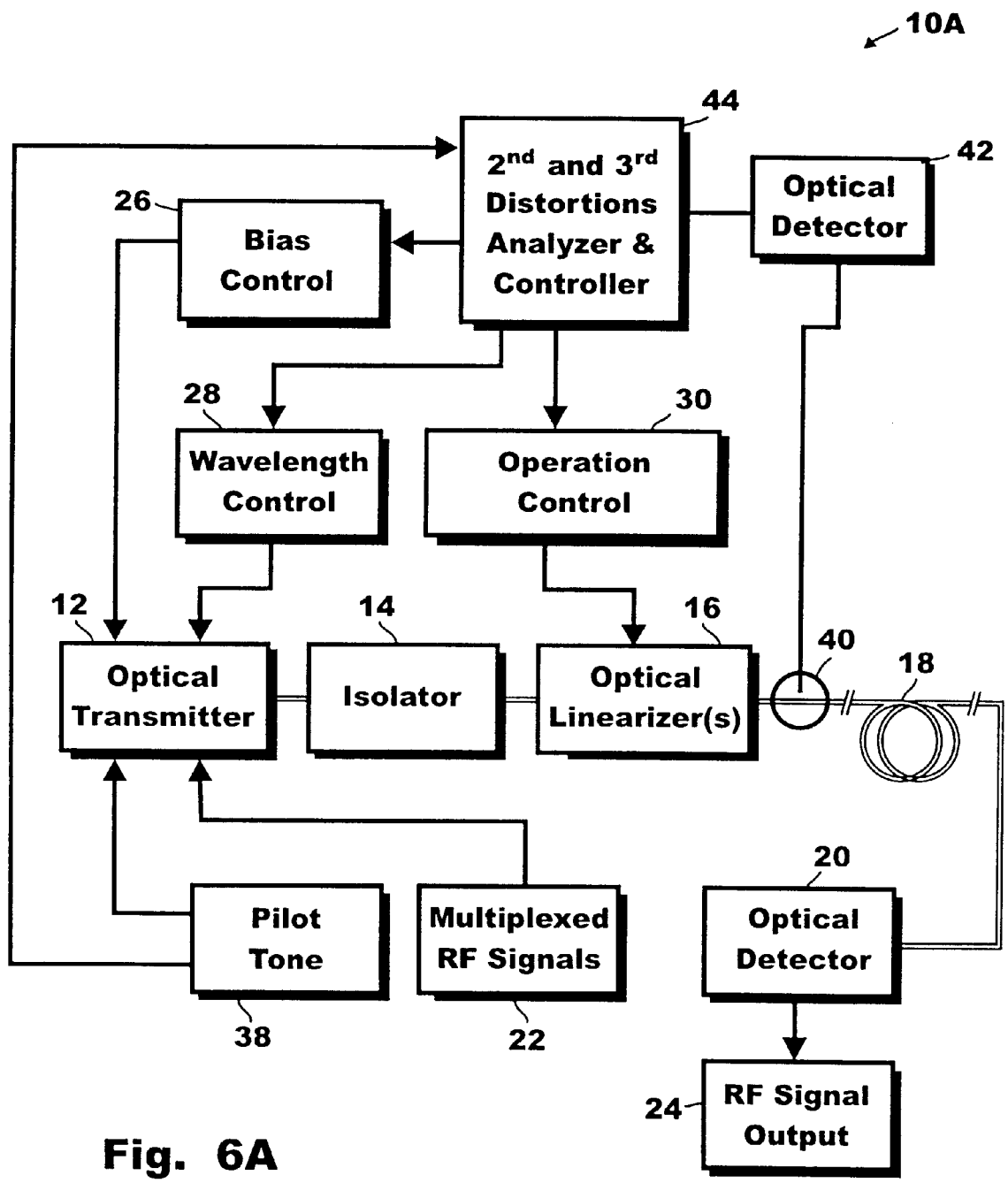
FIG. 6A is a schematic drawing of an embodiment for a fiber optic transmission system which incorporates feedback control.

In FIG. 6A, it is seen that the system 10A provides for transmission of a pilot tone 38 through the transmitter 12, linearizer 16 and optical fiber 18. An optical coupler 40 then directs the output from the optical linearizer 16 (including the pilot tone 38) to a local optical detector 42 which, in turn, passes the output to an analyzer 44. The analyzer 44 then analyzes the second and/or third order distortions of the pilot tone 38 and uses this analysis to appropriately and separately readjust the bias control 26 and the wavelength control 28. Thus, local feedback control can be established for the optical transmitter 12.

Figure 6B:
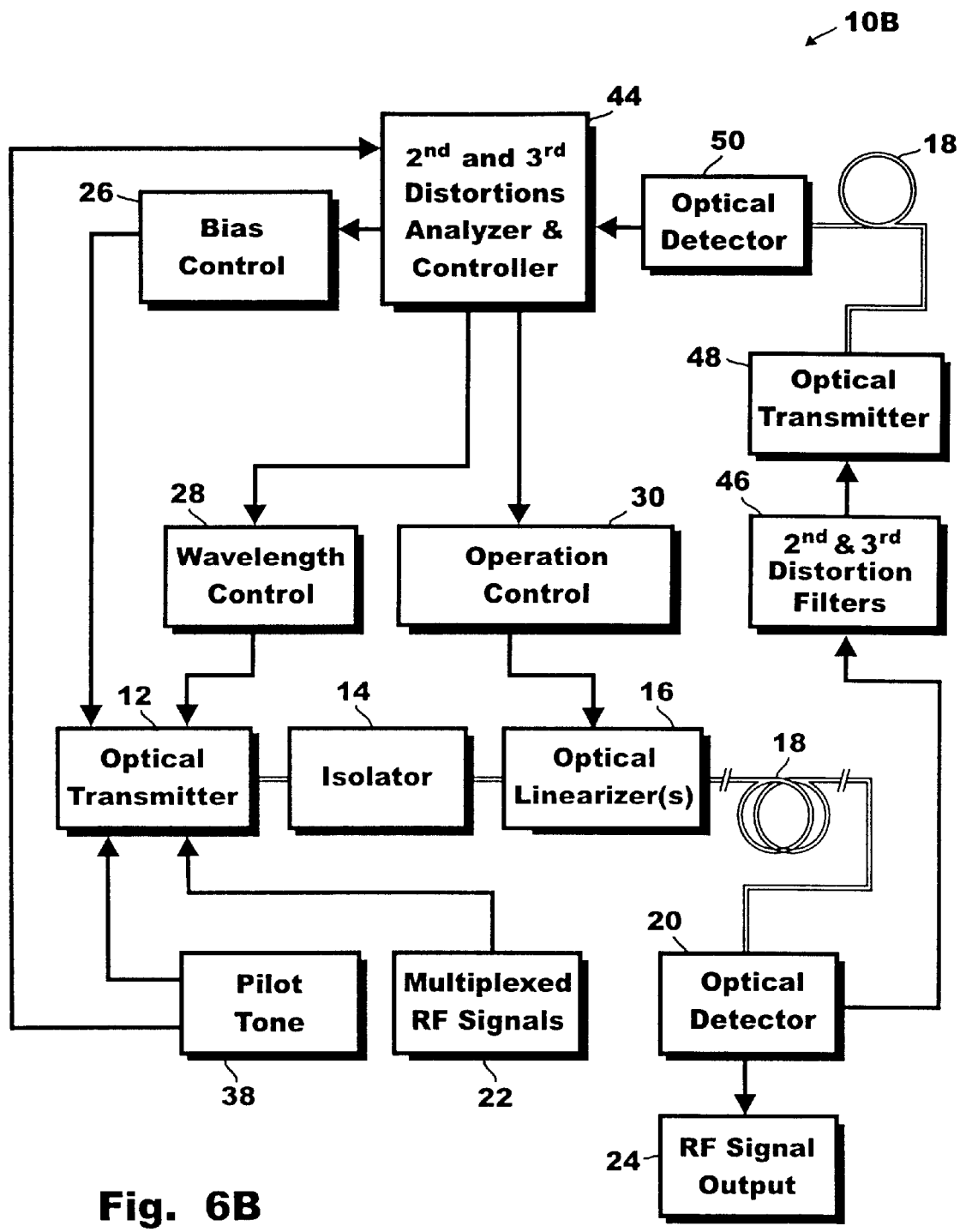
FIG. 6B is a schematic drawing of an alternate embodiment of the system shown in FIG. 6A.

For another alternate embodiment of the present invention, shown as the system 10B in FIG. 6B, the pilot tone 38 is passed through distortion filters 46 after it has passed completely through the optical fiber 18 and the optical detector 20. The filtered pilot tone 38 is then transmitted via an optical transmitter 48 through an optical fiber 18 to the optical detector 50. Again, the analyzer 44 analyzes the second and third order distortions of the pilot tone 38 and uses this analysis to appropriately and separately readjust the bias control 26 and the wavelength control 28. Alternatively, after the pilot tone 38 has passed completely through the optical fiber 18, a localized feedback loop around a linearizer 16 can be accomplished at the input to an optical detector 20.

Operation

Generally, the wavelength dependency of an optical linearizer 16 can be represented by a normalized optical transfer curve F(λ). Mathematically, this transfer curve F(λ) can be expressed in Taylor series around the center emission wavelength $\lambda_c$ of the transmitter:

$$F(\lambda)=F_0(\lambda_c)+F_1(\lambda-\lambda_c)+F_2(\lambda-\lambda_c)^2/2+F_3(\alpha-\lambda_c)^3/6+ \ldots +F_n(\lambda_c)(\lambda-\lambda_c)^n/n!+ \ldots \quad \text{(Eq. 1)}$$

where $F_n=d^n F(\lambda)/d\lambda^n$ with $\lambda=\lambda_c$. Further, the modulated wavelength λ(t) (i.e. modulated signal output) of the optical transmitter 12 can be expressed as $\lambda(t)=\lambda_c+d\lambda_c(t)$. For the present invention, in response to the transfer curve F(λ), the transmitter chirping $d\lambda_c$ creates a modulated linearizer output (dF) shown in FIG. 3. Thus, the output of the optical linearizer 16 can be expressed as:

$$P_{out}(t,\lambda)=P_{TR}(t)\cdot\alpha\cdot F(\lambda) \quad \text{(Eq. 2)}$$

where $P_{out}$ is the output of the optical linearizer 16, $P_{TR}$ is the output of the transmitter, and α is the optical insertion loss of the optical linearizer 16.

In the specific case where the optical transmitter 12 is a DFB laser diode, the transmitter chirping $d\lambda_c$ under single tone modulation can be expressed as:

$$d\lambda_c(t)=-\eta_{FM}\cdot m\cdot(I_b-I_{th})\cdot\sin(\omega\cdot t)\cdot\lambda_c^2/C \quad \text{(Eq. 3)}$$

where C is the light speed, $\eta_{FM}$ is the FM response of the laser, $I_b$ is the laser bias current, $I_{th}$ is the laser threshold current, m is the optical modulation depth, and ω is the modulation angular frequency. Combining Equations (1) to (3), we can obtain the modulated linearizer output from P(λ) due to laser chirping as:

$$P_{out}(t,\lambda)=P_{TR}(t)\cdot\alpha\cdot\{F_0(\lambda_c)+F_1\cdot(\lambda_m\cdot\sin(\omega\cdot t))+F_2\cdot(\lambda_m\cdot\sin(\omega\cdot t))^2/2+F_3\cdot(\lambda_m\cdot\sin(\omega\cdot t))^3/6+\ldots\} \quad \text{(Eq. 4)}$$

where $\lambda_m=-\eta_{FM}\cdot i_b\cdot(\lambda_c)^2/C$ and $i_b=m\cdot(I_b-I_{th})$.

When the optical transmitter is a laser diode the output $P_{TR}$ can be modeled from the laser diode's nonlinear L-I curve, using a Taylor expansion as:

$$P_{TR}(I)=P_{LD}(I_b)+h1\cdot(I-I_b)+h2\cdot(I-I_b)^2/2!+h3\cdot(I-I_b)^3/3!+ \quad \text{(Eq. 5)}$$

where $hn=(d^n P_{LD}(I)/dI^n)$ at $I=I_b$, and I is the laser diode driving current. Let $I=I_b+m\cdot(I_b-I_{th})\cdot\sin(\omega\cdot t)$ and $i_b=m\cdot(I_b-I_{th})$, then the modulated laser diode output is $$P_{TR}(t)=P_{LD}(I_b)+h1\cdot(i_b\cdot\sin(\omega\cdot t))+h2\cdot(i_b\cdot\sin(\omega\cdot t))^2/2+h3\cdot(i_b\cdot\sin(\omega\cdot t))^3/6+\ldots \quad \text{(Eq. 6)}$$

Combining Equations (4) and (6), we can derive the second and third order compensation distortion contents after the output of the optical linearizer 16 as:

$$P_{out,2nd} \approx \alpha\cdot i_b^2\cdot\cos(2\cdot\omega\cdot t)\cdot \quad \text{(Eq. 7)}$$
$$\{-h2\cdot[F_0(\lambda_c)+F_2\cdot(\eta_{FM}\cdot\lambda_c^2/C)^2\cdot i_b^2/2]/4+h1\cdot F_1\cdot$$
$$(\eta_{FM}\cdot\lambda_c^2/C)/2+h1\cdot F_3\cdot(\eta_{FM}\cdot\lambda_c^2/C)^3\cdot i_b^2/12+$$
$$h3\cdot F_1\cdot(\eta_{FM}\cdot\lambda_c^2/C)\cdot i_b^2/12+5\cdot h3\cdot F_3\cdot(\eta_{FM}\cdot\lambda_c^2/C)^3\cdot$$
$$i_b^4/192-P_{LD}(I_b)\cdot F_2\cdot(\eta_{FM}\cdot\lambda_c^2/C)^2/4\}$$

and $$P_{out,3rd} \approx \alpha\cdot i_b^3\cdot\sin(3\cdot\omega\cdot t)\cdot \quad \text{(Eq. 8)}$$
$$\{-h3/24\cdot[F_0(\lambda_c)+F_2\cdot(\eta_{FM}\cdot\lambda_c^2/C)^2\cdot i_b^2/4]+$$
$$h2/8\cdot[F_1\cdot(\eta_{FM}\cdot\lambda_c^2/c)+F_3\cdot(\eta_{FM}\cdot\lambda_c^2/C)^3\cdot$$
$$i_b^2/8]-[h1+h3\cdot i_b^2/8]\cdot F_{22}\cdot(\eta_{FM}\cdot\lambda_c^2/C)^2/$$
$$8+[P_{LD}(I_b)+h2\cdot i_b^2/4]\cdot F_3\cdot(\eta_{FM}\cdot\lambda_c^2/C)^3/24\}.$$

The second order distortion terms in Equation (6) primarily consist of a combination of the second order distortion $P_{out,2nd,LD}$ originated from the laser diode transmitter, second order distortion $P_{out,2nd,LD \otimes linearizer}$ due to the mixing of the first order laser output with the first order chirping-modulated linearizer output, and the second order chirping-modulated linearizer output $P_{out,2nd,linearizer}$. According to Equation (7) with proper $\lambda_c$ and optical linearizer function $F(\lambda)$, the second order distortion $P_{out,2nd,LD}$ can be suppressed or compensated primarily by $P_{out,2nd,LD \otimes linearizer}$ and $P_{out,2nd,linearizer}$. Similarly, the third order distortion can be suppressed by proper $\lambda_c$ and $F(\lambda)$.

The generality of this approach can be demonstrated using a few illustrative examples. For an optical linearizer with linear wavelength attenuation relationship, such as the linearizer 16b shown in FIG. 2, i.e., $F_{n \geq 2}=0$, the second order distortion can be suppressed if $F_1 = h2 \cdot F_0(\lambda_c) \cdot C/(2 \cdot h1 \cdot \eta_{FM} \cdot \lambda_c^2)$ and the third order distortion can be suppressed if $F_1 = h3 \cdot F_0(\lambda_c) \cdot C/(3 \cdot h2 \cdot \eta_{FM} \cdot \lambda_c^2)$, where $F_1$ is the slope of the normalized transfer curve at $\lambda_c$. For an optical linearizer using fused fiber WDM coupler with an optical transfer curve $F(\lambda)$ as shown in FIG. 3, this transfer function $F(\lambda)$ can be expressed as:

$$F(\lambda) = [1 + \cos(\pi \cdot (\Delta \lambda_b + d\lambda)/\Delta \lambda_w)]/2 \quad \text{(Eq. 9)}$$

where $\Delta \lambda_w$ is the fused fiber WDM coupler slope determinant wavelength spacing (i.e. the WDM coupler channel spacing), $d\lambda_c$ is the wavelength chirping of the optical transmitter 12, and $\Delta \lambda_b$ is the coupler operating point offset. According to FIG. 3, we have $\Delta \lambda_b = \lambda_c - \lambda_p$ where $\lambda_p$ is the reference wavelength of the coupler. Using Equations (3), (7), (8) and (9), the second and third order distortions can be approximated as:

$$P_{out,2nd} \approx \quad \text{(Eq. 10)}$$
$$\alpha \cdot i_b^2 \cdot \cos(2 \cdot \omega \cdot t) \cdot \{-h2 \cdot [1 + \cos(\pi \cdot \Delta \lambda_b / \Delta \lambda_w)]/8 -$$
$$h1 \cdot \sin(\pi \cdot \Delta \lambda_b / \Delta \lambda_w) \cdot (\pi/2) \cdot (\lambda_c^2/C) \cdot$$
$$(\eta_{FM}/\Delta \lambda_w)/2 + P_{LD}(I_b) \cdot \cos(\pi \cdot \Delta \lambda_b / \Delta \lambda_w) \cdot$$
$$[\pi \cdot (\lambda_c^2/C) \cdot \eta_{FM}/\Delta \lambda_w]^2/8\}$$

$$P_{out,3rd} \approx \quad \text{(Eq. 11)}$$
$$\alpha \cdot i_b^3 \cdot \sin(3 \cdot \omega \cdot t)/2 \cdot \{-h3/24 \cdot [1 + \cos(\pi \cdot \Delta \lambda_b / \Delta \lambda_w)] -$$
$$h2/4 \cdot \sin(\pi \cdot \Delta \lambda_b / \Delta \lambda_w) \cdot (\pi/2) \cdot (\lambda_c^2/C) \cdot$$
$$(\eta_{FM}/\Delta \lambda_w) + h1 \cdot \cos(\pi \cdot \Delta \lambda_b / \Delta \lambda_w) \cdot$$
$$[\pi \cdot (\lambda_c^2/C) \cdot \eta_{FM}/\Delta \lambda_w]^2/8 + P_{LD}(I_b) \cdot$$
$$\sin(\pi \cdot \Delta \lambda_b / \Delta \lambda_w) \cdot [\pi \cdot (\lambda_c^2/C) \cdot \eta_{FM}/\Delta \lambda_w]^3/24\}.$$

In light of the above, compensation distortion suppressions with a fused fiber WDM coupler can be examined using laser diode parameters where $h1 \approx 0.36$ mW/mA, $h2 \approx -1.5 \cdot 10^{-4}$ mW/mA$^2$, and $h3 \approx 4 \cdot 10^{-6}$ mW/mA$^3$. Assuming $I_b - I_{th} = 60$ mA, m=13%, $\lambda_c = 1310$ nm, $\eta_{FM} = 100$ MHz/mA, optical losses of 4.6 dB, laser output power of 22 mW, 0.85 mA/mW detector responsivity, no additional distortions after fiber transmission/detection and no distortion compensation from the optical linearizer 16, the detected fundamental signal is −18 dBm, the second order harmonic is −79 dBm, and the third order harmonic is −103 dBm. The above distortions all originate from the optical transmitter 12. With optical linearizer parameters $\Delta \lambda_w = 3$ nm and $\Delta \lambda_b = 0.65$ nm, the detected fundamental signal is −19 dBm, the second order harmonics is −120 dBm, and the third order harmonics is −104 dBm. The second order distortion is suppressed by 40 dB after optical compensation, with an additional optical loss of 0.5 dB due to coupler offset from the coupler maximum transmission point. With $\Delta \lambda_w = 3$ nm, FIG. 4 shows the second order suppression as a function of $\Delta \lambda_b$.

According to FIG. 4, a compensation suppression of more than 20 dB can be achieved when $\Delta \lambda_b$ various from 0.6 to 0.7 nm. With optical linearizer 16 having $\Delta \lambda_w = 0.47$ nm and no offset ($\Delta \lambda_b = 0$ nm), the detected fundamental signal is −18 dBm, the second order harmonics is −77 dBm, and the third order harmonics is −140 dBm. The third order distortion is suppressed by 37 dB after optical compensation. With $\Delta \lambda_b = 0$ nm, FIG. 5 shows the third order suppression as a function of $\Delta \lambda_w$. According to FIG. 5, a compensation suppression more than 20 dB can be achieved when $\Delta \lambda_w$ varies from 0.45 to 0.49 nm. It is also possible that with a single optical linearizer 16, we can simultaneously suppress both second and third order distortions. A simulation with the optical linearizer $\Delta \lambda_w = 0.45$ nm and $\Delta \lambda_b = 0.02$ nm yields a detected fundamental signal of −18 dBm, the second order distortions of −107 dBm, and the third order distortions of −123 dBm. In this case, 20 dB or more suppression is simultaneously obtained for both second and third order distortion. To confirm the theory, FIG. 4B is included to show the second order distortion suppression obtained by empirical simulation in comparison with experimental data where h1 ~0.15 mW/mA, h2=−0.7×10$^{-4}$ mW/mA$^2$, $\lambda_c = 1313$ nm, $\eta_{FM} = 270$ MHz/mA, and $\Delta \lambda_w = 5.5$ nm.

In the specific case where the optical linearizer 16 is a fused fiber WDM coupler, it can be appreciated with reference to from FIGS. 3 and 4, that $\lambda_c$ needs to be aligned to $\lambda_p + \Delta \lambda_b$ with certain degree of accuracy to achieve good compensation distortion suppression. Given a specified operation condition for the optical transmitter 12, $\Delta \lambda_w$, and $\Delta \lambda_b$ can be estimated for optimum performance. Knowing $\lambda_c$, a fused fiber WDM coupler can be fabricated with a reference wavelength $\lambda_p = \lambda_c - \Delta \lambda_b$ and the desired slope determinant wavelength spacing $\Delta \lambda_w$. The small offset between $\lambda_c$ and $\lambda_p + \Delta \lambda_b$ can then be minimized by temperature tuning the laser diode (optical transmitter 12) and/or the fused fiber WDM coupler (optical linearizer 16). If we consider the specific case wherein the optical linearizer is a fused fiber WDM coupler, the temperature sensitivity of the coupler (optical linearizer 16) may be around 0.01 nm/° C. and the sensitivity of the DFB laser diode (optical transmitter 12) may be around 0.1 nm/° C. The stability of a good laser diode temperature controller can be better than 0.1° C., which corresponds to wavelength stability on the order between 0.01 to 0.001 nm.

While the particular Optical Linearizer for Fiber Communications as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A communications apparatus which comprises:
   an optical transmitter for producing a modulated signal, said modulated signal having a center emission wavelength ($\lambda_c$) and including a transmitter distortion introduced by said optical transmitter;
   an optical device connected with said optical transmitter for receiving said modulated signal from said transmitter to induce a compensation distortion therewith, said optical device having a reference wavelength ($\lambda_p$) and an operating point wavelength offset ($\Delta \lambda_b$); and
   a means for controlling said optical device to establish an operating wavelength to align ($\lambda_c$) of said transmitter with ($\lambda_p + \Delta \lambda_b$) of said optical device to substantially compensate said transmitter distortion with said compensation distortion.

2. The apparatus as recited in claim 1 wherein said optical transmitter has a wavelength chirping ($d\lambda_c$), and said optical device uses said wavelength chirping ($d\lambda_c$) to induce said compensation distortion.

3. The apparatus as recited in claim 1 wherein said optical device is characterized by a wavelength dependent normalized optical transfer curve $F(\lambda)$, and wherein ($\lambda_p$) and ($\Delta\lambda_b$) of said optical device are based on $F(\lambda)$.

4. The apparatus as recited in claim 3 wherein said optical transfer curve $F(\lambda)$ has a characteristic slope determinant wavelength spacing ($\Delta\lambda_w$) and a slope determined by said slope determinant wavelength spacing ($\Delta\lambda_w$), and further wherein ($\lambda_p+\Delta\lambda_b$) of said optical device is selected relative to said slope of said optical transfer curve $F(\lambda)$ to induce said compensation distortion.

5. The apparatus as recited in claim 1 wherein said transmitter distortion includes second order and third order distortions.

6. The apparatus as recited in claim 1 wherein a first operating temperature is established for said optical transmitter and a second operating temperature is established for said optical device.

7. The apparatus as recited in claim 1 further comprising a bias control for said optical transmitter.

8. The apparatus as recited in claim 1 wherein said optical transmitter is a DFB laser diode.

9. The apparatus as recited in claim 1 wherein said optical transmitter is selected from a group which consists essentially of a direct modulated laser diode, an electro-absorption modulator, and a Mach-Zehnder modulator.

10. The apparatus as recited in claim 1 wherein said optical device is a fused fiber WDM coupler.

11. The apparatus as recited in claim 1 wherein said optical device includes a unit which is selected from a group which consists essentially of wavelength dependent absorptive materials, electro-absOrPtiOn semiconductor waveguides, fiber Bragg-gratings, wavelength dependent coupling in WDM devices, Mach Zehnder waveguide modulators, thin film filters, acoustic-optical tunable filters, tapered fiber filters, and arrayed waveguide grating (AWG) filters.

12. A system for optically linearizing the output of an optical transmitter, the output having a center emission wavelength ($\lambda_c$), and said system comprising:

a means for estimating a wavelength chirping ($d\lambda_c$) in the output of said optical transmitter;

an optical means for generating a compensation distortion in response to said wavelength chirping ($d\lambda_c$), said optical means being characterized by a wavelength dependent normalized optical transfer curve $F(\lambda)$ for converting said wavelength chirping ($d\lambda_c$) into said compensation distortion, said optical transfer curve $F(\lambda)$ having a reference wavelength ($\lambda_p$) and an operating point wavelength offset ($\Delta\lambda_b$); and a means for aligning ($\lambda_p+\Delta\lambda_b$) of said optical means with said center emission wavelength ($\lambda_c$) of said output to establish an effective value for said compensation distortion for linearizing the output of said optical transmitter.

13. The system recited in claim 12 wherein said optical transfer curve $F(\lambda)$ has a characteristic slope determinant wavelength spacing ($\Delta\lambda_2$) and a slope determined by said slope determinant wavelength spacing ($\Delta\lambda_w$), and further wherein ($\lambda_p+\Delta\lambda_b$) of said optical means is selected relative to said slope of said optical transfer curve $F(\lambda)$ to generate said compensation distortion.

14. The system recited in claim 12 wherein the output is a modulated signal including a transmitter distortion introduced by said optical transmitter, and wherein said system further comprises a means for adding said compensation distortion with said transmitter distortion to cancel said transmitter distortion from said modulated signal and thereby linearize the output.

15. The system recited in claim 12 wherein said aligning means is a temperature controller.

16. The system recited in claim 12 wherein said optical transmitter is a DFB laser diode and said optical means is a fused fiber WDM coupler.

17. The system recited in claim 12, wherein said estimating means includes:

an optical detector coupled to receive a fraction of an optical output of said optical means; and a distortion analyzer coupled to receive and process an output of said optical detector to determine a distortion in said optical output.

18. The system as in claim 17, wherein said distortion analyzer controls said optical transmitter in response to optical distortion in said optical output.

19. The system as in claim 17, wherein said distortion analyzer controls said aligning means in response to optical distortion in said optical output to cause said optical means to compensate for said optical distortion.

20. The system as in claim 17, further comprising:

an optical coupler disposed at an output of said optical means to produce said fraction of said optical output to said optical detector;

an optical fiber having a first end coupled to said optical coupler to receive and carry said optical output of said optical means; and an optical receiver to receive optical output from a second end of said optical fiber.

21. The system as in claim 12, further comprising:

an optical fiber having a first end coupled to an output of said optical means to receive and carry said optical output of said optical means;

an optical detector coupled to receive optical output from a second end of said optical fiber;

at least one distortion filter coupled to receive an output from said optical detector;

a feedback optical transmitter to transmit a feedback optical signal in response to output of said one distortion filter; and a feedback fiber to transmit said feedback optical signal to said estimating means, wherein said estimating means includes an optical distortion detector coupled to receive said feedback optical signal, and a distortion analyzer coupled to receive and process an output of said optical distortion detector to determine a distortion in said feedback optical signal.

22. The system as in claim 21, wherein said distortion analyzer controls said optical transmitter in response to said distortion in said feedback optical signal.

23. The system as in claim 21, wherein said distortion analyzer controls said aligning means in response to said distortion in said feedback optical signal to cause said optical means to compensate for said distortion.

24. A method for linearizing the output of an optical transmitter, wherein the output has a center emission wavelength ($\lambda_c$) and includes a modulated signal with a transmitter distortion introduced by the optical transmitter, said method comprising the steps of:

estimating a wavelength chirping ($d\lambda_c$) in the output of the optical transmitter;

using a wavelength dependent normalized optical transfer curve $F(\lambda)$ to convert the wavelength chirping ($d\lambda_c$) into a compensation distortion; and adding the compensation distortion with the transmitter distortion to cancel the transmitter distortion from the modulated signal and thereby linearize the output.

25. The method recited in claim 24 wherein the optical transfer curve $F(\lambda)$ has a reference wavelength ($\lambda_p$) and an operating point wavelength offset ($\Delta\lambda_b$) and the method further comprises the step of aligning ($\lambda_p+\Delta\lambda_b$) with said center emission wavelength ($\lambda_c$) of the output to establish an effective value for the compensation distortion for linearizing the output.

26. The method recited in claim 25, wherein the aligning step is accomplished by tuning a temperature of the optical transmitter.

27. The method recited in claim 24 wherein the transmitter distortion includes second order and third order distortions.

* * * * *